(No Model.)

A. J. OBRIST.
NUT LOCK.

No. 495,363. Patented Apr. 11, 1893.

WITNESSES
Carroll J. Webster.
Floyd W. Webster.

INVENTOR
Andrew J. Obrist
By William Webster
atty

UNITED STATES PATENT OFFICE.

ANDREW J. OBRIST, OF DEFIANCE, OHIO, ASSIGNOR OF ONE-HALF TO F. H. ROHN, OF SAME PLACE.

NUT-LOCK.

SPECIFICATION forming part of Letters Patent No. 495,363, dated April 11, 1893.

Application filed January 13, 1893. Serial No. 458,242. (No model.)

*To all whom it may concern:*

Be it known that I, ANDREW J. OBRIST, of Defiance, county of Defiance, and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a nut lock, and has for its object to provide a positive lock for a nut that shall be inexpensive of construction and convenient of adjustment.

With this object in view the invention consists in a recessed nut, and a washer adapted to fit therein, having an annular corrugation which when forced to a plane parallel with the face of the nut, contracts the walls of the central orifice upon the bolt, and increases the diameter of the washer to cause the same to fit snugly within the recess of the nut.

Figure 1:
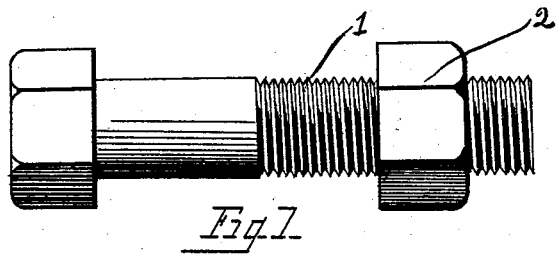
Figure 2:
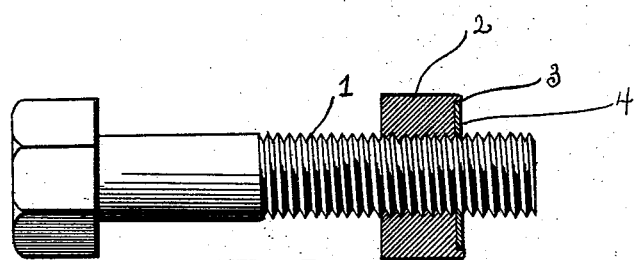
Figures 3, 4:
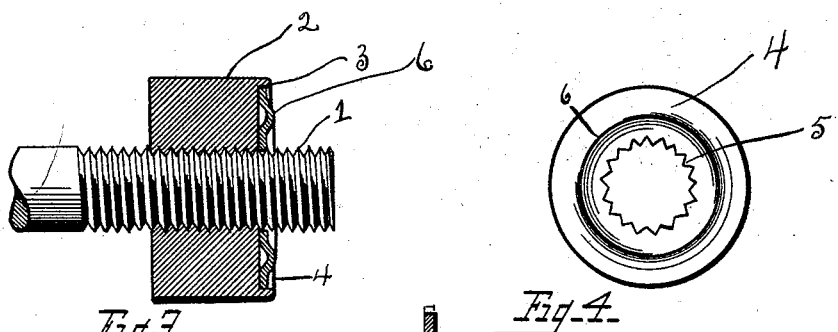
Figure 5:
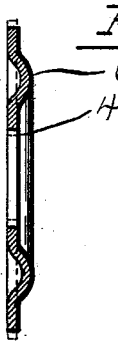

In the drawings: Figure 1 is a plan view of the bolt with a nut locked thereon. Fig. 2 is a like view with the upper half of the nut and washer removed. Fig. 3 is a like view of a section of bolt, showing the washer within the recess prior to its being forced upon the bolt by straightening the corrugation. Fig. 4 is a plan view of the corrugated washer, and Fig. 5 is a sectional edge view.

1 designates a bolt upon which a nut 2 is run, the nut being formed with an annular recess 3 within the top, the recess extending from the threaded opening to near the outer edge of the nut.

4 designates a washer with a central opening, the wall of which is preferably formed with a plurality of radial projections 5, the opening being of less diameter than the bolt when the washer is flattened, and the washer of greater diameter than the interior of the wall of the recess when the washer is flattened. In order to allow the washer to pass upon the bolt, and also to enter the recess of the nut, it is corrugated annularly as at 6, which expands the wall of the central orifice, and contracts the diameter of the washer sufficiently for both purposes.

In operation, the nut is screwed firmly to place, and washer 4 is placed upon the nut, within the recess, with the flat portions of the washer resting upon the top of the nut, when the corrugation is flattened, thereby first expanding the washer to cause the edge to bear firmly upon the wall of the recess, and secondly, contracting the wall of the washer obliqely of, and into the threads of the bolt, until when finally forced to a plane parallel with the face of the nut, as shown in Fig. 2, the impingement upon the wall of the recess of the nut, and the wall of the washer entering the metal of the thread locks the nut immovably upon the bolt, without probability of becoming loosened by jar or expansion or contraction.

It will be seen that the lock is positive, and that by stamping the recess within the top of the nut, with the minimum thickness of metal employed in the washer, the lock is inexpensive.

While I may construct the washer without the projections 5, I prefer to form the projections to prevent the metal from fracture when expanding the orifice by corrugating the washer.

What I claim is—

In a nut lock, a bolt, a nut thereon, formed with a recess within the top, extending from the central threaded orifice to near the edge, and a washer having an annular corrugation adapted when corrugated to pass upon the bolt, and within the recess, and when flattened to impinge firmly upon the walls of the recess, and into the threads of the bolt the wall of the orifice of the washer being toothed.

In testimony that I claim the foregoing as my own I hereby affix my signature in presence of two witnesses.

ANDREW J. OBRIST.

Witnesses:
AUGUST HEIDLEY,
JOHN W. NELSON.